United States Patent Office 3,275,595
Patented Sept. 27, 1966

3,275,595
POLYOLEFINS OF IMPROVED LIGHT STABILITY AND DRY RECEPTIVITY CONTAINING CHROMIUM PHENOLATES
David S. Breslow, Wilmington, Del., assignor to Hercules Incorporated, a corporation of Delaware
No Drawing. Filed Mar. 7, 1963, Ser. No. 263,403
4 Claims. (Cl. 260—45.75)

The present invention relates to polyolefin compositions and, more particularly, to polyethylene and stereoregular polymers of propylene and higher α-olefins having improved stability to light and an improved affinity for dyes.

Highly crystalline, high molecular weight polymers of ethylene, propylene, and higher α-olefins are well known and widely used. However, one of the deficiencies of such polymers which must be overcome to enable their use in many applications is poor stability against the deleterious effect of heat and light. Additionally, since such polymers are extremely hydrophobic and resistant to penetration by aqueous solutions or suspensions and since such polymers do not contain functional groups in their structures which can serve as "dye sites" to enable dyestuffs to become firmly attached, it is quite difficult to color or dye such polymers with any of the dyes normally employed for coloring filaments or fabrics.

It is known that polyethylene and stereoregular polymers of propylene and higher α-olefins can be made receptive to metal-complexing dyes by incorporating in the polymer oxides, hydroxides, or sulfates, or carboxylic acid salts of certain polyvalent metals. Polymers so modified according to the prior art, however, are still subject to degradation by light and are unsuitable for many applications. It is also known that the polyolefins can be stabilized against degradation by light and simultaneously made receptive to metal-complexing dyes by the addition of certain nickel compounds, e.g., the nickel phenolates of bis(p-alkylphenol) sulfides, sulfoxides, and sulfones. However, these nickel compounds often interfere with the obtention of bright and true colors in dyed yarns of the polymers.

In accordance with the present invention, it has been found that these polyolefins can be simultaneously stabilized to light and made more receptive to metal-complexing dyestuffs by incorporating in such polymers a small amount of a bis(p-alkylphenol) sulfoxide or sulfone in which part or all of the phenolic hydrogen atoms have been replaced by chromium, and the use of these chromium compounds leads to brighter, truer colors in dyed yarns than in the case where the corresponding nickel compounds are used.

Any normally solid polymer of a mono-α-olefin having at least 2 carbon atoms can be treated in accordance with the invention. However, the invention is particularly useful in treating stereoregular polymers of monoolefins having from 3 to 6 carbon atoms, including, for instance, isotactic polypropylene, poly(butene-1), poly(pentene-1), poly(3-methylbutene-1), and poly(4-methylpentene-1). Polyethylene, even though it degrades under the influence of light by a mechanism somewhat different than the above stereoregular polymers, is also susceptible to stabilization by the invention.

The chromium compounds used as additives in accordance with the invention markedly increase the light stability of polyethylene, stereoregular polypropylene, and related stereoregular polymers. However, certain of these chromium compounds do not possess sufficient heat stabilizer activity to permit molding or spinning of the polymer under normal operative conditions without embrittlement in the absence of a heat stabilizer. In such cases, slight modification of the molding or spinning conditions or the incorporation of a small amount of a phenolic compound in the polymer will prove beneficial. Although any phenolic compound having antioxidant properties can be used in combination with the chromium compound, the invention is particularly useful with polyalkylphenols, alkylidene bis(alkylphenol)s, bis(alkylphenol) sulfides, 2(2'-hydroxyphenyl)-2,4,4-polyalkylchromans, 4(2'-hydroxyphenyl) - 2,2,4 - polyalkylchromans, and adducts of an alkylphenol and a cyclic terpene. The use of a phenolic compound in addition to the chromium compound is a preferred embodiment of the invention. The presence of the phenolic compound is not necessary for light stability or dyeability reasons. Polymers containing a small amount of the chromium compound have been found to have good light stability and receptivity to certain dyestuffs even in the absence of the phenolic antioxidants.

The chromium compounds that are used as both light stabilizers and dyeing aids in accordance with the invention are generically termed herein as "chromium phenolates" of bis(p-alkylphenol) sulfoxides and bis(p-alkylphenol) sulfones. The quoted term is inclusive of full chromium phenolates, in which all the phenolic hydrogens of the sulfoxides or sulfone are replaced by the same trivalent chromium ion and the remaining valence of chromium is satisfied by an anion or additional phenolic hydrogens, chromium phenol phenolates, in which some but not all of the phenolic hydrogens are replaced by trivalent chromium ions, and chromium phenolates in which each phenolic hydrogen has been replaced by a different trivalent chromium ion and the remaining valences of each chromium ion are satisfied by anions. The chromium phenolates can be prepared by reacting a hydrated chromic salt of a weak acid with a bis(p-alkylphenol) sulfoxide or sulfone, or by reacting the sodium salt of a bis(p-alkylphenol) sulfoxide or sulfone with chromic chloride hexahydrate in absolute alcohol. The bis(p-alkylphenol) sulfoxides and sulfones can be made by oxidation of the corresponding sulfides. Bis(p-amylphenol) sulfoxide can be made, for example, by oxidizing bis(p-amylphenol) sulfide with hydrogen peroxide in acetic acid using the technique shown by Wagner and Zook, Synthetic Organic Chemistry, New York, Wiley & Sons (1953), p. 801. Bis(p-amylphenol) sulfone can be made by oxidizing the above sulfide or sulfoxide with hydrogen peroxide in acetic acid using the same technique.

The phenolates of the present invention are those of bis(p-alkylphenol) sulfoxides and sulfones in which the alkyl group contains 1 to 20 carbon atoms. Preferably, these phenolic sulfoxides and sulfones will be the o,o'- bis(p-alkylphenol) sulfoxides and sulfones. Exemplary of such compounds are o,o'-bis(p-cresol) sulfoxide,
o,o'-bis(p-cresol) sulfone,
o,o'-bis(p-ethylphenol) sulfoxide,
o,o'-bis(p-ethylphenol) sulfone,
o,o'-bis(p-isopropylphenol) sulfoxide,
o,o'-bis(p-isopropylphenol) sulfone,
o,o'-bis(p-tert-butylphenol) sulfoxide,
o,o'-bis(p-tert-butylphenol) sulfone,
o,o'-bis(p-menthylphenol) sulfoxide,
o,o'-bis(p-menthylphenol) sulfone,
o,o'-bis(p-amylphenol) sulfoxide,
o,o'-bis(p-amylphenol) sulfone,
o,o'-bis(p-octylphenol) sulfoxide, i.e., the o,o'-bis(p-1,1,3,3-tetramethylbutylphenol) sulfoxide,
o,o'-bis(p-1,1,3,3-tetramethylbutylphenol) sulfone,
o,o'-bis(p-nonylphenol) sulfoxide,
o,o'-bis(p-nonylphenol) sulfone,
o,o'-bis(p-cyclohexylphenol) sulfoxide,
o,o'-bis(p-cyclohexylphenol) sulfone,
o,o'-bis(p-dodecylphenol) sulfoxide, and
o,o'-bis(p-dodecylphenol) sulfone, as well as o,m'-bis(p-amylphenol) sulfoxide,
o,m'-bis(p-amylphenol) sulfone,
o,m'-bis(p-octylphenol) sulfoxide,
o,m'-bis(p-octylphenol) sulfone, and the like. Permissible anion substituents are numerous and varied. Preferred anions include hydroxide, alkoxide, acyl, oxide, halide, sulfate, nitrate, phosphate, thiocyanate, cyanide, p-toluenesulfonate, methanesulfonate, phosphite, aryl and alkyl phosphonates, molybdate, and the like. Typical alkoxide anions include methoxide, ethoxide, octyloxide, decyloxide, propoxide, butoxide, amyloxide, and dodecyloxide.

The phenolic compounds used in the prferred embodiment of the invention are also well known. Polyalkylphenols that can be used are either di- or trialkylphenols. Particularly preferred are the 2,4-6-trialkylphenols described in U.S. 2,581,907 to Smith, Jr., et al. Inclusive of such compounds are:

2,4-dimethyl-6-t-butylphenol,
2,4-dimethyl-6-(alpha,alpha,gamma,gamma-tetramethylbutyl)phenol,
2,6-di-t-butyl-4-methylphenol,
2-methyl-4,6-di-t-butylphenol,
2,6-di-t-butyl-4-sec-butylphenol,
2,4,6-tri-t-butylphenol,
2,4,6-triethylphenol,
2,4,6-tri-n-propylphenol,
2,4,6-triisopropylphenol,
2,6-di-t-octyl-4-propylphenol,
2,6-di-t-butyl-4-ethylphenol,
2,4-dicyclohexyl-6-methylphenol,
2-isopropyl-4-methyl-6-t-butylphenol,
2,4-dimethyl-6-t-amylphenol,
2,4-di-t-amyl-6-methylphenol,
2,6-di-t-butyl-4-isopropylphenol,
2,6-di-t-amyl-4-methylphenol,
2,6-di-t-amyl-4-isopropylphenol,
2,4-diisopropyl-6-t-butylphenol, and
2,4-diisopropyl-6-sec-hexylphenol.

The preferred compounds of this class are those which have secondary or tertiary alkyl groups at the 2- and 6-position and a normal alkyl group at the 4-position, a representative of this class being 2,6-di-t-butyl-p-cresol. More preferably, the normal alkyl group in the 4-position is one containing from about 1 to 20 carbon atoms while the secondary or tertiary alkyl groups in the 2- and 6-positions each contain from about 3 to 20 carbon atoms. Any of the dialkylphenols are suitable; particularly preferred is the 2,6-di-t-butylphenol.

The second class of phenolic compound, the alkylidenebis(alkylphenol), is characterized by the general formula

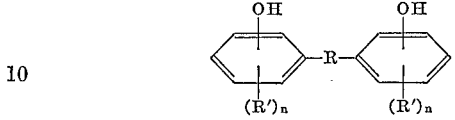

wherein R is an alkylidene radical of 1 to 5 carbon atoms and wherein R' is an alkyl group of 1 to 12 carbon atoms and $n$ is an integer from 1 to 3. When more than one R' substituent is present on a phenyl group, each R' can be the same or different.

Exemplary of these alkylidene-bis(alkylphenol)s that may be used are 2,2'-methylene-bis(5-isopropylphenol),
2,2'-methylene-bis(4-methyl-6-isopropylphenol),
2,2'-methylene-bis(4-methyl-6-t-butylphenol),
2,2'-methylene-bis(4-t-butyl-6-methylphenol),
2,2'-methylene-bis(4,6-di-t-butylphenol),
2,2'-methylene-bis(4-nonylphenol),
2,2'-methylene-bis(4-decylphenol),
4,4'-methylene-bis(2,6-di-t-butylphenol),
2,2'-isopropylidene-bis(5-methylphenol),
4,4'-methylene-bis(2-methyl-6-t-butylphenol),
2,2'-ethylidene-bis(4-methyl-6-t-butylphenol),
2,2'-ethylidene-bis(4,6-di-t-butylphenol),
2,2'-ethylidene-bis(4-octylphenol),
2,2'-ethylidene-bis(4-nonylphenol),
2,2'-isopropylidene-bis(4-methyl-6-isopropylphenol),
2,2'-isopropylidene-bis(4-isopropylphenol),
2,2'-isopropylidene-bis(4-isopropyl-6-methylphenol),
2,2'-isopropylidene-bis(4-methyl-6-t-butylphenol),
2,2'-isopropylidene-bis(4-octylphenol),
2,2'-isopropylidene-bis(4-nonylphenol),
2,2'-isopropylidene-bis(4-decylphenol),
2,2'-isobutylidene-bis(4-methyl-6-t-butylphenol),
2,2'-isobutylidene-bis(4-nonylphenol),
4,4',-butylidene-bis(3-methyl-6-t-butylphenol), etc.

Suitable bis(alkylphenol) sulfides include 4,4'-thiobis(2-t-butyl-5-methylphenol) and 2,2'-thiobis(4-methyl-6-t-butylphenol).

The 2(or 4)-(2'-hydroxyphenyl)chromans that may be used are those which have one of the following general formulas:

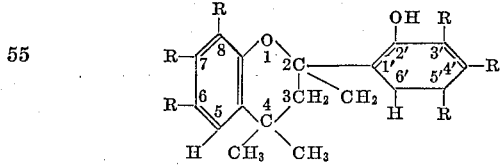

or

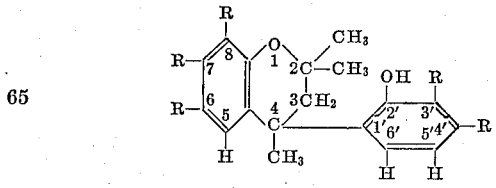

where each R may be hydrogen or alkyl, but at least one R in each of the aromatic rings is alkyl. These compounds may also be named as benzopyrans. Thus, the 2(2'-hydroxyphenyl)chromans may be named as 2,3-dihydro-2(2'-hydroxyphenyl)-1,4-benzopyrans or 3,4-dihydro-2(2'-hydroxyphenyl)-1,2-benzopyrans and the 4(2'- hydroxyphenyl)chromans may be named as 2,3-dihydro-4(2'-hydroxyphenyl)-1,4-benzopyrans or 3,4-dihydro-4 (2'-hydroxyphenyl)-1,2-benzopyrans. The 2(2'-hydroxyphenyl)chromans are also sometimes named as flavans, i.e., 2'-hydroxyflavans. The alkyl substituents in each of the aromatic rings may be any alkyl radical, as, for example, methyl, ethyl, propyl, isopropyl, butyl, isobutyl, tert-butyl, amyl, hexyl, isohexyl, octyl, isooctyl, 2-ethylhexyl, nonyl, isononyl, decyl, undecyl, dodecyl, etc. Preferably, at least one alkyl radical in each aromatic ring will contain at least four carbon atoms or the sum of the carbon atoms in the alkyl radicals in each ring will be at least four. Exemplary of these 2(or 4)-(2'-hydroxyphenyl)chromans that may be used in combination with the nickel complexes are 2(2'-hydroxyphenyl)-2,4,4,5',6-pentamethylchroman,
4(2'-hydroxyphenyl)-2,2,4,5',6-pentamethylchroman,
2(2'-hydroxyphenyl)-5',6-diisopropyl-2,4,4-trimethylchroman,
2(2'-hydroxyphenyl)-5',6-diisopropyl-2,4,4,3',8-pentamethylchroman,
2(2'-hydroxyphenyl)5',6-di-t-butyl-2,4,4-trimethylchroman,
4(2'-hydroxyphenyl)-5',6-di-t-butyl-2,2,4-trimethylchroman,
2(2'-hydroxyphenyl)-5',6-dioctyl-2,4,4-trimethylchroman,
2(2'-hydroxyphenyl)-5',6-dinonyl-2,4,4-trimethylchroman,
4(2'-hydroxyphenyl)-5',6-dinonyl-2,2,4-trimethylchroman,
2(2'-hydroxyphenyl)-5',6-didecyl-2,4,4-trimethylchroman, etc.

The alkylidene-bis(alkylphenol)s are prepared by any of the well-known procedures of the prior art. Usually, they are prepared by reacting an alkylphenol with formaldehyde, acetaldehyde, acetone, or methyl ethyl ketone, etc., in the presence of a strong acid such as hydrochloric acid, etc. In a similar fashion, the 2(2'-hydroxyphenyl) chromans are prepared by reacting an alkylphenol with acetone and the 4(2'-hydroxyphenyl)chromans are prepared by reacting an alkylphenol with mesityl oxide. Thus, in many of these reactions a mixture of alkylidene-bis(alkylphenol)s and (2'-hydroxyphenyl)chromans is obtained, as, for example, when acetone is condensed or reacted with an alkylphenol the reaction product may be a 2(2'-hydroxyphenyl)chroman or an isopropylidene-bis (alkylphenol), depending on the reaction conditions, or the reaction product may be a mixture of these two types of compounds. In such cases, the individual compounds need not be isolated but instead the reaction product may be used with excellent results.

The terpene-phenol adducts that are used in accordance with the invention are known materials that have been described frequently in the prior art.

Generically defined, they are adducts of phenol or an alkylphenol that contains from 1 to 2 alkyl substituents of 1 to 10 carbon atoms each and a cyclic unsaturated terpene or dihydroterpene of empirical formula $C_{10}H_{16}$ or $C_{10}H_{18}$, respectively. They can be prepared by condensing phenol, or an alkylphenol, with the terpene, or dihydroterpene, in varying ratios in the presence of an acidic catalyst.

Suitable cyclic terpenes and dihydroterpenes from which the aforesaid adducts can be made include carvomenthene, dipentene, α-pinene, α-terpinene, terpinolene, 2-menthene, 3-menthene, dihydroterpinolene, dihydrodipentene, camphene, $\Delta^3$-carene, β-pinene, and the like. Suitable phenols, in addition to phenol itself, include the various isomeric cresols, 2,4-xylenol and other isomeric xylenols, p-sec-butylphenol, p-isopropylphenol, o-isopropylphenol, m-isopropylphenol, o,o'-diisopropylphenol, o,o'-di-t-butylphenol, o-amylphenol, o-nonylphenol, and similar compounds.

The two reactants can be condensed in varying ratio. Any ratio within the range of 0.3 to 3 moles of terpene or dihydroterpene per mole of the phenolic compound is satisfactory, but it is preferred to employ a ratio within the narrower range of 0.5 to 2.5 moles of terpene or dihydroterpene per mole of the phenolic compound.

The adduct formation is carried out by contacting the two reactants in the presence of an acid catalyst at a temperature within the range of about 0 to 150° C. and allowing the reaction to proceed. An inert solvent may be used as a reaction medium for convenience if so desired. Normally the reaction will go to substantial completion in from 1½ to 5½ hours. Upon termination of the reaction, unconsumed reactants and volatile by-products can be removed by distillation at reduced pressure since the adducts themselves are high boiling materials.

The acid catalyst can be any of those acids or acidic compounds that are useful catalysts in condensation reactions generally. These include mineral acids such as sulfuric acid, organic acids such as p-toluene sulfonic acid, boron trifluoride and its derivatives, as, for instance, complexes of boron trifluoride and an ether, e.g., boron trifluoride—ethyl ether complex, metal chlorides such as aluminum chloride and stannic chloride, and acidic clays.

The terpene-phenol adducts are in all cases not a simple chemical compound but rather a mixture of compounds, principally phenolic ethers and terpenylated phenol. Thus, for instance, the adduct of 2 moles of camphene and 1 mole of p-cresol is a mixture of compounds in which mixture the principal ingredient is diisobornyl-p-cresol (the isobornyl radical being formed by isomerization of camphene) but which also contains lesser amounts of the isobornyl ether of p-cresol.

In the case of other terpenes, or dihydroterpenes, and other phenols, similar adducts are formed in which the proportion of ingredients will vary depending on the ratio of reactants and the catalyst employed. Consequently, the adducts employed in the invention are incapable of structural definition.

The amount of the chromium compound incorporated in the polymer can be varied from a very small amount up to several percent. More specifically, beneficial results are normally obtained when it is employed in an amount from about 0.1 to about 5% based on the weight of the polymer.

As previously mentioned, one of the preferred, but optional, embodiments of the invention comprises incorporating into the polymer a phenolic compound in addition to the chromium compound. The phenolic compound, where used, preferably comprises from about 0.01 to about 5% by weight of the polymer.

The additives used in accordance with this invention may be admixed with the polyolefin by any of the usual procedures for incorporating a stabilizer in a solid material. A simple method is to dissolve the stabilizers in a low boiling solvent such as benzene or chloroform and, after thoroughly mixing the solution with the polymer in flake or other such form, evaporating the solvent; or they may be incorporated by various mechanical means such as mixing, etc.

In addition to the phenolic compound and the chromium compound, there may also be present compounds capable of decomposing peroxides, ultraviolet light absorbers, phosphites, antacids such as calcium soaps, or other antioxidants. Other materials may also be incorporated in the polymer, as, for example, pigments, fillers, etc.

The following examples will illustrate the degree of stabilization and dyeability that is obtained when a polyolefin is stabilized in accordance with this invention. The term "RSV" as used heren denotes reduced specific viscosity, which is the specific viscosity divided by concentration of a 0.1% weight/volume solution of polymer in decahydronaphthalene at 135° C. All parts and percentages are by weight unless otherwise stated, and the percentage of stabilizer is based on the weight of polymer.

Example 1

Stereoregular, or isotactic, polypropylene having a birefringent melting point of about 168° C. and a reduced specific viscosity of 4.0 was thoroughly blended with 0.5% of a chromium phenolate of o,o'-bis(p-1,1,3,3-tetramethylbutylphenol) sulfone having the formula

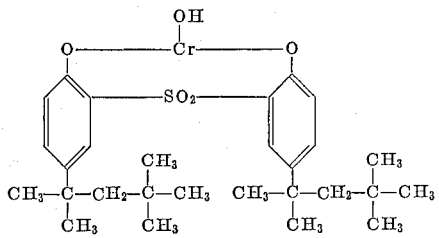

and 0.5% of the reaction product of 2 moles of nonylphenol and 1 mole of acetone, the reaction product (hereinafter referred to as NP-A-RP) comprising a mixture of isopropylidene-bis(nonylphenol) and 2(2'-hydroxyphenyl)-2,4,4-trimethyl-5,6-dinonylchroman. The chromium phenolate contained 8.2% chromium and was prepared by dissolving 4.7 parts bis[2-hydroxy-5-(1,1,3,3-tetramethylbutyl)phenyl] sulfone in a solution of 0.7 part sodium in 200 parts absolute ethanol, adding a solution of 2.7 parts chromic chloride hexahydrate in 64 parts in absolute ethanol, allowing the solution to stand overnight to precipitate sodium chloride, filtering off the precipitate, vacuum distilling to remove the ethanol, taking up the residue in hexane, filtering, and then vacuum distilling to give a brittle, green resin. The blend was extruded into molding powder at 210° C., and the molding product was then pressed into sheets 25 mils thick. Strips cut from these sheets and 0.5 inch wide were fastened onto pieces of white cardboard and exposed to outdoor weathering in southern Florida at a 45° angle facing south. During the outdoor exposure, the development of brittleness in each strip was observed by periodically folding to an angle of 180° and noting any change taking place on the fold line. The following rating schedule was used to evaluate the degree of brittleness:

1—Unchanged from original condition
2—Slight surface crazing on fold
3—Shallow cracks on fold
4—Breaks in cheesy manner, but pieces hang together; considered failure
5—Brittle break, failure The outdoor exposure rating for the composition is shown in the table below.

TABLE 1

| | Rating After Florida Exposure | |
|---|---|---|
| | Rating | Langleys |
| Control (contains NP-A-RP but no chromium compound) | 5 | 20,000 |
| Example 1 | 3 | 30,000 |

Example 2

Polyethylene having a density of 0.96 was stabilized with 0.5% of the chromium compound of Example 1, the embrittlement time being determined in a fadeometer. The control sample containing no stabilizer failed in 7 days whereas the stabilized composition was still flexible after 15 days.

Examples 3–7

In these examples yarns (6 denier per filament) were melt spun from a stereoregular polypropylene blend prepared as in Example 1, except that 0.75% of the chromium phenolate was used, and fabric in the form of tubing was knit from 210-denier, 35-filament yarn having the following physical properties:

| | |
|---|---|
| Tenacity, grams per denier | 6.25 |
| Elongation at break, percent | 35.8 |
| Free shrinkage in boiling water, percent | 2.5 |

Fabric was also prepared in the same way from a polymeric blend containing 0.75% of a nickel phenolate of o,o' - bis(p - 1,1,3,3 - tetramethylbutylphenol) sulfone (15.9% nickel) and 0.5% NP-A-RP. The fabrics were scoured for 30 minutes at 70° C. at a 40/1 liquor/fiber ratio by weight in an aqueous solution containing 1% sodium dodecyl benzene sulfonate, an anionic detergent, and 0.25% sodium carbonate, based on the weight of the fiber. The scoured, wet fabric specimens were introduced into a dye bath at room temperature, whereupon the dye bath was heated to boiling in 30 minutes with continuous stomper agitation, and boiling and agitation were continued for 2 hours. The dyed fabrics were rinsed in water and then scoured in a scouring bath containing 2% sodium carbonate and 5% sodium dodecylbenzene sudfonate, based on the weight of the fiber, in the ratio of 40/1, scouring bath/fiber, by weight, for 30 minutes at 70° C. The dyed fabrics were then rinsed and air dried at room temperature.

The dye baths for these examples were prepared as follows:

| | |
|---|---|
| Ratio of dye liquor to fiber (by weight) | 40/1 |
| Emulsifier (sodium dodecylbenzene sulfonate), percent (O.W.F.)[1] | 1 |
| Dye, percent (O.W.F.)[1] | 0.25 to 5 |

[1] O.W.F.=base on weight of fiber.

except that the dye baths for Examples 4–7 additionally contained 0.2% (O.W.F.) acetic acid. The dye in each case was added to the dye bath in the form of a concentrated aqueous dispersion of dye particles.

Table 2 following lists pertinent data with respect to the structural formula of the dye used in each example, general color, and a notation of the color of the dyed fabric according to the Munsell system of color, which measures the three attributes of color known in the system as hue, value, and chroma, as compared with Munsell color standards, and color stability of the fabric after subjection to fadeometer exposure. In the Munsell system, the hue notation of color indicates its relationship to red, yellow, green, blue, and purple, the value notation indicates its lightness; and the chroma notation indicates its strength (or departure from neutral). In recording a color by Munsell notation, the symbol for hue is written first and is followed by a symbol written in fraction form, the numerator indicating the value and the denominator indicating the chroma (H; V/C). The measure of a given color sample then is the Munsell notation of its position in relation to the standard in the Munsell Book of Color, Munsell Color Company, Inc., Baltimore, Maryland (1929–1960). Evaluation of color stability after fadeometer exposure was made by noting the change in shade using the International Grey Scale rating where 5=no change
4=noticeable change
3=moderate change
2=severe change
1=very severe change
(0)=completely stripped of color.

In the table, the letter "A" following the example number denotes fabrics prepared from blends containing chromium phenolates, and "B" denotes fabrics from blends containing the corresponding nickel phenolates.

TABLE 2

| Example No. | Structural Formula of Dye Molecule | General Color of Dyed Fabric | Munsell Value (H; V/C) | Color Stability on Fadeometer Exposure— | |
|---|---|---|---|---|---|
| | | | | For 20 Hours | For 40 Hours |
| 3A | 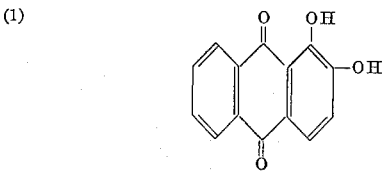 | Violet | 5P; 6/6 | 4 | 3 |
| 3B | | Brown | 5Y; 5/4 | 4 | 4 |
| 4A | | Yellow | 5Y; 8/10 | 4 | 3 |
| 4B | | do | 5Y; 8/10 | 5 | 4+ |
| 5A | | Brown Red | 5R; 6/8 | 4–5 | 4 |
| 5B | | Brown Orange | 10R, 5/10 | 5 | 4 |
| 6A | | Red | 10RP; 6/8 | 3 | |
| 6B | | Red Brown | 5R; 4/6 | 5 | 5 |
| 7A | | Grey Blue | 5PB; 7/2 | 3 | 2 |
| 7B | | Violet | 5RP; 6/4 | 3 | 2 |

As can be seen from the above comparison of Munsell color notations, the chromium phenolates of bis(p-alkylphenol) sulfones gave truer, brighter colors in dyed yarns than in cases where the corresponding nickel phenolates were used.

The dyes that can be employed in dyeing any of the polymers described herein are those selected dyes of low water solubility having the ability to penetrate or diffuse into the polymer from a dispersion of dye particles in an acidified aqueous dye bath and the ability to be insolubilized within the polymer by forming stable complexes with the chromium compounds of this invention. In view of these characteristics, the selected dyes of this invention are termed "disperse-mordant" dyes to distinguish them from conventional mordant dyes which are water soluble and which are incapable of diffusing into stereoregular polyolefins. Suitable dyes include the anthraquinone and monoazo dyes characterized by the presence therein of substituent groups which form insoluble stable complexes with polyvalent metal mordanting agents, by the absence of substituent groups which impart substantial water solubility to said dye, such as sulfonic acid substituent groups, and by small compact molecular size.

Some typical dye structures meeting these requirements are exemplified by the following structural formulas. However, the invention is not limited to these.

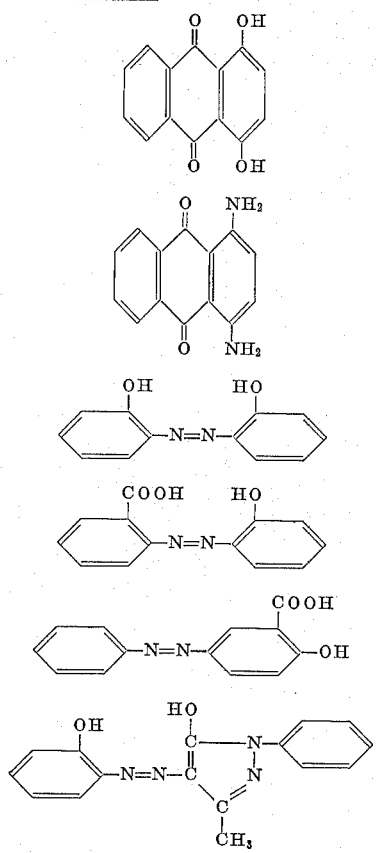

(8) 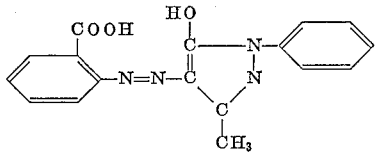

In structural Formulas 4 to 8, inclusive, naphthalene rings may be also substituted for the benzene rings shown.

It will be seen that suitable anthraquinone dyes have hydroxyl groups in the 1,2-positions, as depicted by Formula 1 above, or hydroxyl or NH₂ groups in the 1,4-positions, as in Formulas 2 and 3 above. It will be seen that azo dyes in accordance with this invention have a hydroxyl group on a carbon atom adjacent to a carbon atom attached to an azo group, as in Formulas 4, 5, 7 and 8, or a hydroxyl group on a carbon atom adjacent to a carbon atom attached to a carboxyl group, as in Formula 6. Suitable dyes may also have, permissibly, but not necessarily, one or more of the following substituent groups attached to the dye molecule: alkyl, hydroxyalkyl, alkoxyl, hydroxyl, nitro, halo, acetamido, or sulfonamido groups.

The amount of dye employed can be varied as desired from as little as 0.1%, or less, based on fiber weight, to as much as 5% or more, depending largely on the depth of color desired, it being apparent that depth of color increases with increasing amount of dye employed.

The stereoregular polymers of this invention in the form of film, fiber, filament, thread, yarn, cord, or fabric woven from such fibers, having the chromium compound uniformly dispersed therein, are given a preliminary conventional scouring treatment in an aqueous detergent or soap bath to remove residual spinning, molding, and weaving lubricants and sizing agents prior to dyeing. The thus prepared film or fiber is then immersed wet in the dye bath containing a dispersion of dye particles of the selected dye and a conventional wetting agent, usually at room temperature. The dye bath is then brought to the boiling point and held at the boiling point, preferably with agitation, until the desired dye shade has been attained, after which the dyed fibers or film are rinsed, given a post-dyeing conventional scouring treatment in an aqueous detergent or soap bath to remove any dye particles adhering loosely to the surfaces, and then dried. It is apparent, therefore, that the mechanics of the dyeing operation, per se, apart from selection of dyestuff, follow more or less conventional dyeing practice.

From the foregoing, it is apparent that polyethylene and stereoregular polymers of α-olefins having 3 or more carbons may be modified in accordance with this invention to impart light stability and dye affinity to the polymers as well as to any fiber, film, or other shaped object made from these polymers.

What I claim and desire to protect by Letters Patent is:

1. A polyolefin selected from the group consisting of polyethylene and stereoregular polymer of a mono-α-olefin having at least 3 carbon atoms containing about 0.01 to about 5%, based on the weight of the polyolefin, of a chromium phenolate selected from the group consisting of the chromium phenolates of bis(p-alkylphenol) sulfoxides and bis(p-alkylphenol) sulfones in which at least one phenolic hydrogen has been replaced by the trivalent chromium ion and about 0.01 to about 5% by weight of the polyolefin of a phenolic compound selected from the group consisting of polyalkylphenols, alkylidene bis(alkylphenol)s, bis(alkylphenol) sulfides, 2(2'-hydroxyphenyl)-2,4,4 - polyalkylchromans, 4(2' - hydroxyphenyl)-2,2,4-polyalkylchromans, and adducts of an alkylphenol and a cyclic terpene.

2. The composition of claim 1 in which the chromium phenolate is the full chromium phenolate of o,o'-bis(p-1,1,3,3-tetramethylbutylphenol) sulfone.

3. The composition of claim 1 in which the polyolefin is stereoregular polypropylene.

4. The composition of claim 1 in which the polyolefin is polyethylene.

References Cited by the Examiner
UNITED STATES PATENTS

| 3,163,492 | 12/1964 | Thomas | 8—55 |
| 3,164,438 | 1/1965 | Thomas | 8—42 |
| 3,186,976 | 6/1965 | Baumgartner | 8—97 |

LEON J. BERCOVITZ, *Primary Examiner.*

G. W. RAUCHFUSS, Jr., *Assistant Examiner.*

UNITED STATES PATENT OFFICE
CERTIFICATE OF CORRECTION

Patent No. 3,275,595                                                       September 27, 1966

David S. Breslow

It is hereby certified that error appears in the above numbered patent requiring correction and that the said Letters Patent should read as corrected below.

Column 12, line 15, for "0.01" read -- 0.1 --.

Signed and sealed this 22nd day of August 1967.

(SEAL)
Attest:

ERNEST W. SWIDER                                    EDWARD J. BRENNER
Attesting Officer                                              Commissioner of Patents